Oct. 7, 1969   R. N. ABILD   3,471,126
MOVABLE VANE UNIT
Filed Oct. 31, 1966
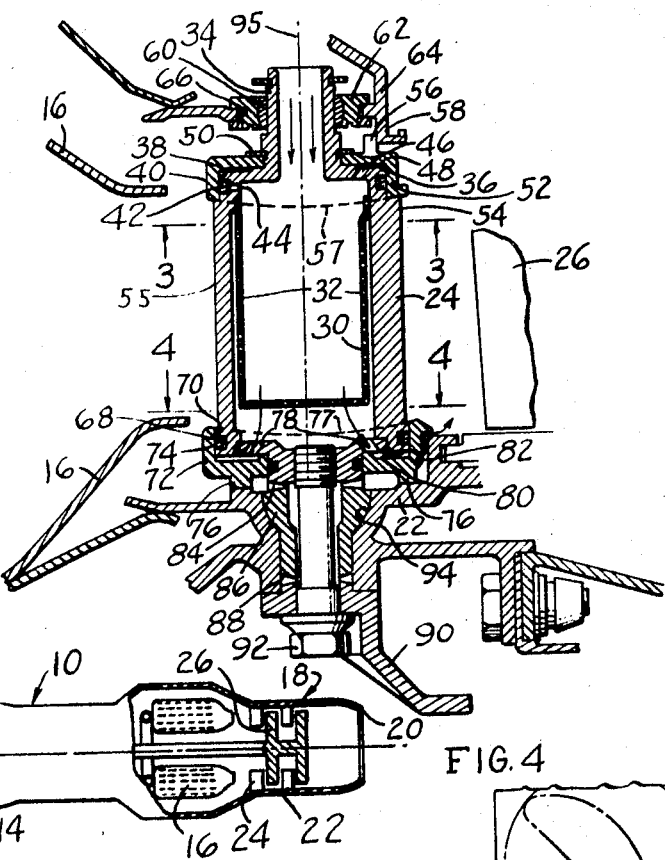
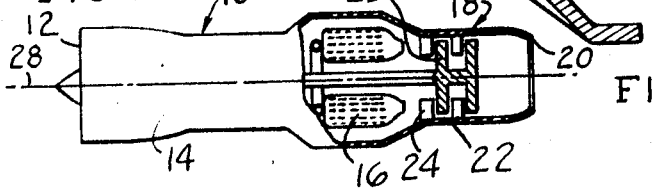
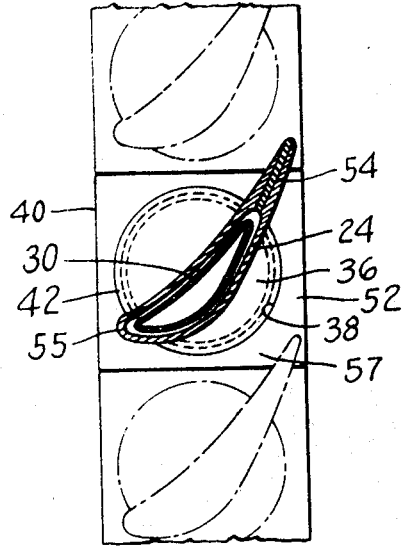
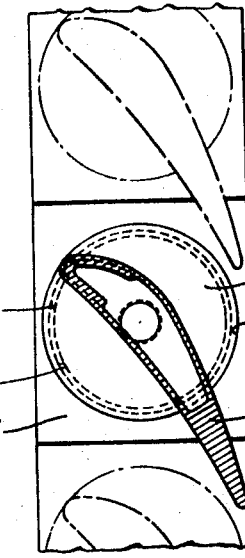
INVENTOR.
ROBERT N. ABILD
BY *Fishman + VanKirk*
ATTORNEYS

United States Patent Office 3,471,126
Patented Oct. 7, 1969

3,471,126
MOVABLE VANE UNIT
Robert N. Abild, New Britain, Conn., assignor to United
Aircraft Corporation, East Hartford, Conn., a corporation of Delaware
Filed Oct. 31, 1966, Ser. No. 590,996
Int. Cl. F01d 9/02, 25/12
U.S. Cl. 253—39.1        10 Claims This invention relates to a movable vane unit for a fluid flow system. More particularly, this invention relates to a movable vane unit for a turbine vane assembly and a sealing arrangement for the vane unit to prevent leakage of system fluid.

In many gas turbine installations, it is desirable to rotate turbine stator vanes in order to vary the airflow area between the vanes. The rotation of turbine stator vanes is of particular interest in high performance gas turbine aircraft engines. However, an effective rotating vane arrangement must prevent leakage of system fluid by an appropriate sealing arrangement and allow for deflection of the vanes caused by such factors as thermal distortion.

The problem of providing an effective sealing arrangement to prevent leakage of system fluid is of major concern. System performance can be adversely affected to a serious degree by excessive fluid system leakage, and this problem can be aggravated if leakage varies with changes in position of the stator vanes. The problem is of particular concern in aircraft gas turbine engines where the turbine system fluid is the combustion gas which is exhausted rearwardly to produce forward thrust. Leakage of the combustion gases around the rotating turbine vane structure not only reduces the amount of gas from which work can be extracted in the turbine for driving the compressor but also reduces the gas mass available for rearward exhausting in the thrust production process and can also cause overheating of otherwise cooler areas.

Deflection of the rotatable stator vanes other than about the axis of rotation poses both a leakage problem and a problem of insuring continued vane rotatability. The movement of concern is from such factors as thermal distortion which may cause uneven expansion between ends of the rotatable vane unit. Provisions must be made to insure that such movement will neither result in leakage of system fluid nor interfere with rotating the vane.

The present invention will be described in connection with an aircraft gas turbine engine; however, it will be understood that the invention is equally applicable to any turbomachinery assembly, either turbine unit or compressor unit, in which it is desired to provide rotating stator vanes.

In the present invention each rotatable stator vane has a general airfoil shape in cross section, and the ends of the vane enlarge into circular pistons. The circular pistons fit into circular cavities in rectangular segments of rings forming the vane end boundaries. The outer rectangular segment is held against the turbine case by a pressure differential. The inner rectangular end segment is piloted on the vane end and can move fore and aft to seal against a diaphragm rim, and a pressure differential holds the inner rectangular segment onto the vane and against overhanging sections of the airfoil for sealing purposes. A ball joint at the inner end of the vane unit allows for movement of the unit, and a ball joint at the outer end of the vane unit acts as a radial and axial bearing for vane rotation.

Accordingly, one object of the present invention is to provide a novel rotating stator vane and sealing arrangement for a turbo-machinery installation.

Another object of the present invention is to provide a novel rotatable stator vane and seal arrangement for a gas turbine engine.

Still another object of the present invention is to provide a novel rotatable stator vane and seal arrangement particularly suitable for use in the turbine unit of a gas turbine engine.

Still another object of the present invention is to provide a novel rotatable stator vane and seal arrangement particularly suitable for use in the turbine section of an aircraft gas turbine engine.

Still another object of the present invention is to provide a novel rotatable stator vane and seal in which fluid pressures contribute to the sealing arrangement.

Still another object of the present invention is to provide a novel rotatable stator vane and seal unit in which the system fluid contributes to the sealing arrangement.

Still another object of the present invention is to provide a novel rotatable stator vane and seal unit which allows for deflection of the unit without impairing rotatability or sealing.

Other objects and advantages will be apparent from the following detailed description and drawings.

In the drawings:
FIGURE 1 is a representative showing of an aircraft gas turbine engine.
FIGURE 2 is a sectional elevational view of a movable stator vane and seal unit of a stator assembly in accordance with the present invention.
FIGURE 3 is a view along line 3—3 of FIGURE 2 looking at the inner end of the stator assembly.
FIGURE 4 is a view along line 4—4 of FIGURE 2 looking at the outer end of the stator assembly.

Referring now to FIGURE 1, an aircraft gas turbine engine 10 is shown. Engine 10 has an air inlet 12, a compressor section 14, a combustion section or burners 16, a turbine section 18 and an exhaust nozzle 20. Turbine section 18 has an outer annular casing 22 around the interior of which are placed one or more stages of turbine stator vanes 24, each stage leading to a rotor unit 26. Stator vanes 24 are in an annular array around engine axis 28, and at least some of the stator vanes 24 are rotatable about axes radial with respect to axis 28.

The basic operation of the engine of FIGURE 1 is in accordance with the well known operation of gas turbine engines. Air enters inlet 12, is compressed in compressor section 14 and is then delivered to burners 16 where fuel is added and burned to produce a high energy, high temperature gas stream. The combustion gas stream is then expanded through turbine section 18 where work is extracted by the turbine rotor 26 to drive the compressor, and the combustion gas stream is then discharged rearwardly of the engine through exhaust nozzle 20, generating forward thrust. Rotation of stator vanes 24 varies the flow area between the stators and thus can regulate the velocity and direction of gas flow through the turbine to suit various performance requirements.

Referring now to FIGURE 2, the details of one rotatable stator vane unit are shown, the entire structure shown in FIGURE 2 sometimes being referred to as a vane unit or stator unit. Burner 16, rotatable stator vane 24 and rotor 26 are shown in series flow relationship for the flow of combustion gases from burner 16 to the turbine unit, and it will be understood that engine axis 28 is located some distance above FIGURE 2. The interior of stator vane 24 is hollow and has a can-like structure 30 fitted within the vane and spaced from the interior walls of the vane. Can 30 has a plurality of air holes 32 leading from the interior of the can to the interior walls of vane 24, and a coolant is caused to flow through the hollow interior of can 30 and through the openings 32 so that the coolant scrubs along the interior of vane 24 to cool the vane. The coolant may be bleed air from compressor section 14, and it is introduced into the interior of vane 24 as shown by the arrows through a neck portion 34 on the inner end of the vane.

Referring now to both FIGURE 2 and FIGURE 3, vane 24 has a general airfoil shape in cross section, and the airfoil shape expands to an inner circular piston 36 between the main airfoil body and neck 34. Inner circular piston 36 fits within a circular opening 38 in an inner rectangular housing 40. The exterior surface of a sealing ring 42 seats and seals against the inner surface of circular opening 38 in inner rectangular housing 40, and the interior surface of sealing ring 42 is exposed via a passageway 44 to the pressure of the coolant within vane 24 to urge ring 42 to its sealing position. Another passageway 46 leads to an annular chamber 48 between inner circular piston 36 and inner rectangular housing 40 so that the pressure of the coolant in vane 24 is present in annular chamber 48.

Inner rectangular housing 40 is piloted relative to vane 24 on neck 34 and is retained to vane 24 by a retaining ring 50. A depending rim 52 of inner rectangular housing 40 is in sealing contact with at least a part of the rear overhanging portion 54 of vane 24. There may be a similar sealing contact between rim 52 and an overhanging front portion 55 of vane 24. Since, as shown in FIGURE 3, either or both of front portion 55 and vane rear portion 54 may overlap to an adjacent inner rectangular housing, both the surface 57 (shown dotted in FIGURE 2) of rectangular housing 40 and the surface of overhangs 54 and 55 in contact therewith are spherical with a radius whose center is at the engine centerline 28. An extending flange portion 56 is in sealing contact with an engine diaphragm structure 58, diaphragm 58 being an annular casing divider element between stages of the turbine assembly, and flange 56 cooperating with similar flange elements in the annular array of stator units to form a substantially continuous annular seal against diaphragm 58.

Neck 34 is supported by a bearing element 60, the outer surface of bearing element 60 being in the form of a ball section which is contained in a correspondingly shaped opening in a housing 62. Housing 62 is connected to engine structure by support element 64, housing 62 being free to move slightly fore and aft of the engine (right and left across the paper) by virtue of a small annular spacing between housing 62 and support element 64. The inner surface of ball section bearing 60 is cylindrical, and the section with which it makes contact on neck 34 serves as a journal. The circular shape of ball section bearing 60 allows for slight rocking movement of vane 24 without destroying the bearing-journal support arrangement between bearing 60 and neck 34.

Referring now to FIGURE 2 and FIGURE 4, the outer end of vane 24 expands from its airfoil shape to an outer circular piston 68 which is housed in a circular opening 70 in an outer rectangular housing 72. A sealing ring 74 located in a groove in outer circular piston 68 establishes a sealing contact between its exterior surface and circular opening 70 in outer rectangular housing 72. Holes 73 in piston 68 deliver high pressure gas to the interior surface of ring 74 to urge it to its sealing position. Flanges 76 extend from outer rectangular housing 72, and butt against segments of outer turbine case 22. The flanges 76 are arcuate in shape about the engine centerline and combine with similar flanges in adjacent stator units around the engine to form a pair of annular sealing rings between the turbine stator assembly and turbine outer casing 22.

As described above in connection with surface 57, the surface 77 (shown dotted in FIGURE 2) of housing 72 and vane front and rear overhangs in contact therewith are spherical with a radius whose center is at the engine centerline 28 to allow overlap of the vane front and/or rear overhangs to adjacent outer rectangular housings.

The central portion of outer circular piston 68 may be formed as an integral part of the piston or may, for convenience of assembly, be a separate segment with a welded connection as shown. A pair of passages 78 lead from the hollow interior of vane 24 to an annular chamber 80 between outer circular piston 68 and outer rectangular housing 72. The coolant within hollow stator vane 24 flows through passageway 78 to annular chamber 80 and is then discharged from the vane assembly through one or more passageways 82 in outer rectangular housing 72. After discharge through passageway 82, the coolant then flows along the interior of casing structure 22 as indicated by the arrow to provide a cooling flow for the casing, and it then joins the turbine fluid stream at the entrance to rotor 26.

Outer circular piston 68 is connected through a face spline 84 to a ball section 86 in the form of a partial ball element, and an extension from ball element 86 is connected through another face spline 88 to an actuating lever arm 90. Bolt 92 threaded into outer piston 68 secures lever 90 and ball section 86 against separation at the face splines. Ball section 86 is housed in a correspondingly shaped ball section housing 94 which acts as both a radial and axial bearing for the rotatable vane unit.

Combustion gases from burner 16 are delivered to the leading edge of the turbine stator vanes, pass between adjacent vanes, and are then delivered to rotor 26. Actuation of lever arm 90 is transmitted through face spline 88, ball section 86 and face spline 84 to outer circular piston 68 to cause rotation of each stator vane 24 about axis 95 with neck 34 rotating in bearing 60. The rotation of vane 24 is substantially about an axis which is radial with respect to the centerline of the engine. Preferably, all of the stator vanes in a stage of stator vanes will be rotated uniformly and will assume a uniform angular position. As can best be seen in FIGURES 3 and 4, rotation of the vanes 24 results in varying the area of the combustion gas passage between the vanes, and this area variation is a particularly beneficial and useful feature in high performance gas turbine aircraft engines.

As has been pointed out previously, sealing problems have been a serious obstacle in the past to the realization of an effective rotatable turbine stator vane assembly. Leakage of combustion gases past or through the rotating mechanism must be eliminated or minimized in order to avoid serious loses of working gases and engine thrust.

In the present invention, the combustion gases themselves and the coolant inside of the hollow stator vane contribute to and cooperate in providing a highly effective sealing arrangement. The coolant which, as has been said, may be bleed from the compressor is introduced via passage 46 to annular chamber 48 between inner circular piston 36 and the interior of inner retcangular housing 40. The exterior surface of inner rectangular housing 40 is exposed to the pressure of the combustion gases at the discharge from burner 16. The coolant within stator 24 is selected so that its pressure level is less than the pressure level of the combustion gases to which the exterior surfaces of inner rectangular housing 40 are exposed. Thus, a pressure differential is created across inner rectangular housing 40 urging housing 40 toward inner circular piston 36 to seat against portions of the piston. Also, rim 52 of inner rectangular housing 40 is urged into sealing engagement with the rear overhanging portion 54 of stator vane 24. As an additional sealing feature at the inner end of vane 24, sealing ring 42 is exposed through passageway 44 to the pressure of the coolant and is thus urged into sealing engagement with the interior surface of rectangular housing 40. In the manner thus described, leakage between inner circular piston 36 and inner rectangular housing 40 is eliminated or minimized.

Additional sealing at the inner end of the stator unit is accomplished by urging flange 56 into sealing engagement with diaphragm 58. The pressure of the combustion gases at the leading edge of the stator unit (the end closest to burner 16) is exposed to a higher combustion gas pressure than the pressure level at the trailing edge of the stator assembly. Thus, the entire stator assembly, including vane 24 and inner housing 40 is urged to the right to hold flange 56 in sealing engagement with diaphragm 58. Since, as has been stated above, the flanges 56 in each of the stator units cooperate to form a substantially continuous annular ring about the engine axis in contact with the diaphragm 58, combustion gas leakage around the inner end of the stator unit is thus eliminated or minimized.

Referring now to the outer end of the stator unit, the area of outer circular piston 68 and outer rectangular housing 72 as seen in FIGURE 4 is exposed to the pressure of the combustion gas passing through the stator assembly to the rotor. A force is generated urging outer rectangular housing 72 and outer circular piston 68 toward casing 22 because of a difference in surface area on the side of housing 72 closest to casing 22. Thus, flanges 76 are urged into sealing engagement with casing 22 to eliminate or minimize the leakage of combustion gases between outer rectangular housing 72 and casing 22. Once again, it will be borne in mind that the flanges 76 on each of the outer rectangular housings cooperate with each other to form two annular rings around the engine center line which are in sealing engagement with outer casing 22.

Leakage between outer rectangular housing 72 and outer circular piston 68 is eliminated or minimized by the action of sealing ring 74 in sealing contact with the surface of circular opening 70 and also by the sealing engagement at points of contact between piston 68 and housing 72 created by the previously described pressure differential across the outer end of the stator unit.

As will be apparent to those skilled in the art, a substantial temperature differential may exist in the area of the outer end of the stator unit. The structure on the interior side of casing 22 is exposed to hot combustion gases while the structure on the exterior side of housing 22 is exposed to temperatures approaching ambient temperature. Thus, a substantial temperature differential can exist across casing 22 and structure in that area such as ball section 86. Furthermore, this temperature differential is subject to variation with changes in either combustion gas temperature or ambient temperature, and changes in this temperature differential can result in an expansion or contraction of parts and thus result in a deflection of vane 24 at an angle to its axis of rotation, especially fore or apt. In the event that such movement does occur, the movement will be transmitted to ball section bearing 60 and ball section bearing 60 will pivot or rock in its housing 62 to allow the entire stator unit to pivot. Since the pivoting or rocking motion of ball section bearing 60 in its housing allows the entire stator unit to pivot as a single unit, all of the sealing structure described above remains intact, and the sealing integrity remains undisturbed.

Radial motion of the inner end of the vane toward or away from the engine centerline is allowed by the cylindrical contact surfaces between neck 34 and bearing 60.

While a preferred embodiment has been shown and described, various modifications and substitutions may be made without departing from the spirit and scope of this invention. Accordingly, it is to be understood that this invention has been described by way of illustration rather than limitation.

What is claimed is:
1. A movable vane unit for a fluid flow system including: a vane having:
   a body section of general airfoil shape in cross section,
   a first generally circular end section at one end of said body section, and
   a second generally circular end section at the other end of said body section;
   a first housing for said first end section;
   a first casing;
   first sealing means for urging at least part of said first housing against said first casing to prevent the leakage of pressurized system fluid therebetween;
   second sealing means for preventing the leakage of pressurized system fluid between said first housing and said first end section;
   a journal element extending from said first end section;
   bearing means rotatably supporting said journal element to allow rotation of said vane about a predetermined axis;
   a first ball section on said bearing means to allow movement of said bearing means and said vane at an angle to said predetermined axis;
   a second housing for said second end section;
   a second casing;
   third sealing means for urging said second housing against said second casing to prevent leakage of pressurized system fluid therebetween;
   fourth sealing means for preventing the leakage of pressurized system fluid between said second housing and said second end section;
   a second ball section connected to said second end section;
   a bearing surface in said second casing conforming to at least part of the shape of said second ball section, said bearing surface supporting said second ball section;
   and actuating means connected to said second ball section for rotating said second ball section to rotate said vane about said predetermined axis.

2. A movable vane unit as in claim 1 wherein:
said first sealing means includes flange means extending from said first housing, said flange means being in contact with said first casing and being exposed to pressurized system fluid whereby said flange means is held in sealing engagement with said first casing.

3. A movable vane unit as in claim 2 wherein:
the side of said first housing removed from said first end section is exposed to system fluid; and wherein
at least part of said body section is hollow for the passage of an internal fluid, the pressure level of said internal fluid being lower than the pressure level of said system fluid; and wherein
said second sealing means includes first chamber means between said first end section and said first housing, said first chamber means being exposed to said internal fluid whereby a pressure differential across said first housing urges part of said first housing into sealing engagement with said first end section.

4. A movable vane unit as in claim 3 wherein said first housing is rectangular in cross section and includes a first recess of generally circular cross-sectional shape, said first end section being in said first recess.

5. A movable vane unit as in claim 1 wherein:
the side of said second end section removed from said second housing is exposed to system fluid; and wherein
at least part of said body section is hollow for the passage of an internal fluid, the pressure level of said internal fluid being lower than the pressure level of said system fluid; and wherein
said fourth sealing means includes second chamber means between said second end section and said second housing, said second chamber means being connected to receive said internal fluid whereby a pressure differential across said second end section urges part of said second end section into sealing engagement with said second housing.

6. A movable vane unit as in claim 5 wherein:
said third sealing means includes flange means extending from said second housing and being in contact with said second casing; and wherein a pressure differential urges said flange means into sealing engagement with said second casing.

7. A movable vane unit as in claim 6 wherein: said second housing is rectangular in cross section and includes a second recess of generally circular cross-sectional shape, said second end section being in said second recess.

8. A movable vane unit as in claim 5 including passage means from said second chamber means to discharge said internal fluid from said vane.

9. A movable vane unit as in claim 1 wherein a first end part of said vane at said one end of said body section is in opposing relation to a surface of said first housing, said first end part of said vane and said surface of said first housing being of spherical shape about a common point.

10. A movable vane unit as in claim 1 wherein a second end part of said vane at said other end of said body section is in opposing relation to a surface of said second housing, said second end part of said vane and said surface of said second housing being of spherical shape about a common point.

References Cited

UNITED STATES PATENTS

| 2,930,579 | 3/1960 | Boyd et al. | 253—78 X |
| 3,224,194 | 12/1965 | De Feo et al. | 253—39.1 X |

FOREIGN PATENTS

| 1,101,346 | 4/1955 | France. |
| 1,325,261 | 3/1963 | France. |
| 755,527 | 8/1956 | Great Britain. |
| 946,185 | 1/1964 | Great Britain. |

EVERETTE A. POWELL, JR., Primary Examiner

U.S. Cl. X.R.

253—78